Sept. 19, 1950     J. F. HERSH ET AL     2,523,115

PHASE SHIFTING DEVICE

Filed March 13, 1946

INVENTORS
JOHN F. HERSH
JAMES J. FARAN, JR.
JOHN R. REITZ

By *M. O. Hayes*

Attorney

Patented Sept. 19, 1950

2,523,115

UNITED STATES PATENT OFFICE 2,523,115

PHASE SHIFTING DEVICE

John F. Hersh and James J. Faran, Jr., Cambridge, Mass., and John R. Reitz, State College, Pa., assignors to the United States of America as represented by the Secretary of the Navy Application March 13, 1946, Serial No. 654,198

6 Claims. (Cl. 178—44)

This invention relates to electrical wave phase shifting devices and more specifically to phase shifting devices with two or more circuit branches, wherein each branch has a particular phase shifting characteristic, and wherein a novel difference-measuring circuit gives the vectorial difference between the voltages at two points in the device.

It is well known in the art to use combinations of resistors, capacitors, and inductors across a line or circuit to obtain voltages out of phase with the applied voltage. Such a circuit is determined for a particular frequency, and is not usable at any other frequency of the applied voltage for a predetermined degree of phase shift desired. The voltage output also varies widely with frequency. This disadvantage necessitated either a multiplicity of phase shifters, each adjusted to a separate frequency, or a variable phase shifter which has to be set for each frequency change. With either circuit, a frequency range could be covered only in a cumbersome step-by-step procedure.

It is an object of this invention to provide novel means for obtaining a phase shift which is nearly constant over a considerable frequency range.

It is a further object of this invention to provide a novel means for shifting phase, wherein the output voltage is nearly independent of frequency.

Figure 1:
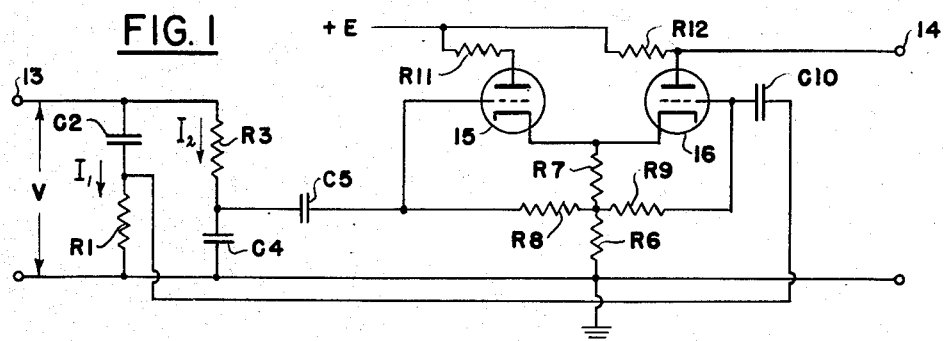
Figure 1 shows a schematic diagram of the phase shifter and difference measuring circuits.

Referring to Figure 1, which shows a schematic diagram of the phase shift circuit and the difference measuring circuit, the voltage V is applied to the input 13. Current flows through branches R1—C2 and R3—C4 and develops voltages across the elements of each branch whose vectorial sum equals V. The voltage $E_{c4}$ is applied to the grid of tube 15 through coupling capacitor C5. Similarly, voltage $E_{r1}$ is applied to the grid of tube 16 through coupling capacitor C10. The cathodes of tubes 15 and 16 are connected to ground through common resistances R6 and R7. The plates of tubes 15 and 16 are connected through resistances R11 and R12 to the positive voltage source, +E. Output voltage is taken at point 14, and is determined by the total of voltages applied between grid and cathode of tube 16. If a negative voltage $E_{c4}$ is applied to the grid of tube 15, the current flow through tube 15 is reduced and a lower voltage is developed across resistances R6 and R7. This drop in cathode bias on tube 16 amounts to a positive change in the grid-to-cathode voltages applied to tube 16, whose total determines the output to point 14. Voltage $E_{r1}$ is applied to tube 16 through coupling capacitor C10 so it adds to the voltage from the cathode resistors R6 and R7. As this cathode voltage has a variation 180° out of phase with the voltage $E_{c4}$ which causes the variation, the grid-to-cathode voltage on tube 16 is the difference between $E_{r1}$ and $E_{c4}$. This produces an output voltage proportional to the input voltage V but differing in phase by an angle of approximately 90 degrees.

Figure 2:
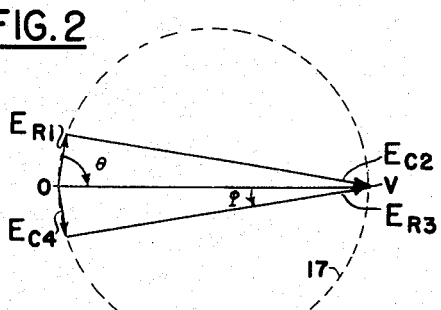
Figure 2 is a vector diagram of the various voltages present in the phase shifting circuit.

Figure 2 shows the vectorial diagram of the voltages in the phase shifting circuit. The phase angle, $\theta$, is determined by the total impedance vector $$Z_1 = R_1 - \frac{j}{WC2}$$

as follows, $$\theta = \tan^{-1}\frac{WC2}{R1}$$

and the phase angle, $\varphi$, is determined by the impedance vector $$Z_2 = R_3 - \frac{j}{WC4}$$

as follows, $$\varphi = \tan^{-1}\frac{WC4}{R3}$$

The resistance components $E_{r1}$ and $E_{r3}$ of the voltage drop are in phase with the currents $I_1$ and $I_2$ which lead applied voltage V by angles $\theta$ and $\varphi$ respectively. The capacitative voltage components $E_{c2}$ and $E_{c4}$ lag the currents by 90 degrees. The resulting vectorial diagram is as shown in Figure 2. Dotted lines 17 and 18 are the loci of the intersections of resistive and capacitative voltage components as frequency is varied. With a proper choice of RC constants, the difference voltage between $E_{r1}$ and $E_{c4}$ can be of constant voltage and approximately 90° phase shift from voltage V over a useful range of frequencies.

Figure 3:
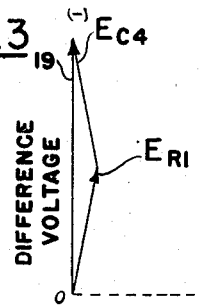
Figure 3 is a vector diagram of the resultant voltage output of the difference measuring circuit.

This difference voltage between $E_{r1}$ and $E_{c4}$ is represented vectorially in Figure 3, and is the total of the voltages applied in Figure 1 between grid and cathode of tube 16. The output of tube 16 is therefore the vectorial difference between $E_{r1}$ and $E_{c4}$, but 180° out of phase with the applied grid-to-cathode voltage.

Figure 4:
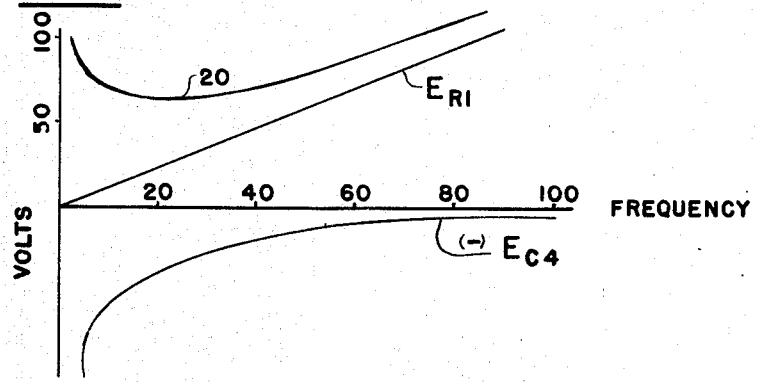
Figure 4 is a graph of the scalar values of voltages for a frequency range.

Referring to Figure 4, the scalar value of $E_{r1}$ rises proportional to frequency while $E_{c4}$ is inversely proportional to frequency. The difference voltage 20 has a broad minimum in the useful range.

Figure 5:
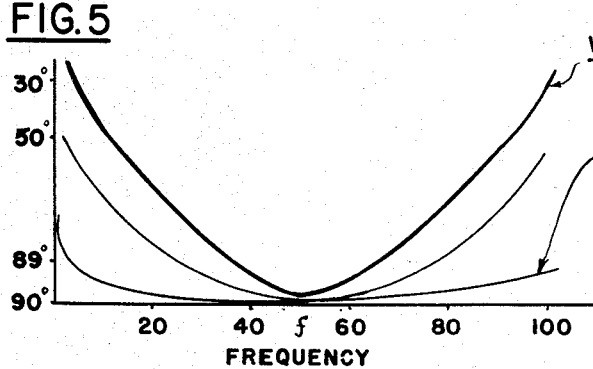
Fig. 5 illustrates a series of graphs showing the phase shift as a function of the frequency for various circuit constants.

Fig. 5 illustrates a series of graphs showing the phase shift as a function of frequency for various circuit constants. These graphs show that the phase shift can be made exactly 90 degrees at some frequency $f$, but that the phase shift differs slightly from 90 degrees above and below the frequency $f$. It will be seen that the closer $\varphi$ is to zero degrees and $\theta$ is to 90 degrees, the smaller is the error in phase shift at the extreme ends of the frequency range.

What we claim is:

1. A phase shifting circuit comprising a voltage source, two impedances, each having capacitative and resistive components, connected across said voltage source, a first and a second vacuum tube, said first vacuum tube having its grid connected to one side of the capacitative component of one of the said impedances and a cathode circuit including a resistance common with said second vacuum tube, the other side of the last-named capacitative component being connected to said resistance at the end remote from the cathode of the first tube, and said second vacuum tube having its grid connected to one end of the resistive component of the other said impedance and its cathode circuit common with the first vacuum tube, the other end of the last-named resistance component being connected to said other end of said last-named capacitative component, the plate output of said second tube containing the vectorial difference between the above capacitative voltage component and the above resistive voltage component, said difference voltage being displaced 90 degrees from the applied voltage.

2. A frequency shifting network, comprising, a source of alternating voltage at first and second points in said network, two impedances connected in parallel between said points, each impedance comprising a reactance element in series with a resistance element, one impedance having the resistance element thereof connected to said source at said first point and the other impedance having the resistance element thereof connected to the source at said second point, a pair of vacuum tubes having the control grids coupled to said impedances between the resistance and reactance elements thereof, respectively, said tubes having a common cathode circuit including a resistance, and a network output connection from the plate of one of said tubes.

3. The frequency shifting network of claim 2 wherein the control grids are capacity-coupled to said impedances, respectively.

4. The frequency shifting network of claim 2 wherein said control grids are resistance-connected to said cathode circuit.

5. A frequency shifting circuit comprising, a bridge circuit in which first and fourth legs are reactance elements and second and third legs are resistance elements, said first and third legs being joined and said second and fourth legs being joined, a source of voltage connected to the bridge at said junctions, a pair of vacuum tubes having a common cathode circuit including a resistance and having the control grids thereof coupled to the junction of the first and second legs and the junction of the third and fourth legs, respectively, the plate output of one of said tubes being phase altered in accordance with the vectorial sum of a resistive and reactive voltage component from two of said legs.

6. The circuit of claim 5 in which said first and said fourth legs of the bridge are capacitative reactances.

JOHN F. HERSH.
JAMES J. FARAN, Jr.
JOHN R. REITZ.

REFERENCES CITED

The following references are of record in the file of this patent:

UNITED STATES PATENTS

| Number | Name | Date |
|---|---|---|
| 1,831,516 | Stewart | Nov. 10, 1931 |
| 2,376,392 | Shepherd | May 2, 1945 |
| 2,408,193 | Beste | Sept. 24, 1946 |
| 2,411,876 | Hansen | Dec. 3, 1946 |